US011044449B2

United States Patent
Anders et al.

(10) Patent No.: US 11,044,449 B2
(45) Date of Patent: *Jun. 22, 2021

(54) OPTIMIZED COMPUTER DISPLAY RENDERING FOR USER VISION CONDITIONS

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/678,243

(22) Filed: Nov. 8, 2019

(65) Prior Publication Data

US 2020/0092528 A1  Mar. 19, 2020

Related U.S. Application Data

(63) Continuation of application No. 15/822,688, filed on Nov. 27, 2017, now Pat. No. 10,536,678.

(51) Int. Cl.
  *H04N 9/73* (2006.01)
  *H04N 9/64* (2006.01)
  *G09G 3/20* (2006.01)
  *G06F 3/048* (2013.01)
  (Continued)

(52) U.S. Cl.
  CPC ............ *H04N 9/73* (2013.01); *G02B 27/0101* (2013.01); *G02B 27/0172* (2013.01); *G09G 3/2003* (2013.01); *H04N 9/64* (2013.01); *G02B 2027/0112* (2013.01); *G02B 2027/0178* (2013.01); *G06F 3/0487* (2013.01)

(58) Field of Classification Search
  CPC combination set(s) only.
  See application file for complete search history.

(56) References Cited

U.S. PATENT DOCUMENTS

| 5,589,898 A | 12/1996 | Atkinson |
| 6,784,905 B2 | 8/2004 | Brown et al. |
| 9,609,028 B2 * | 3/2017 | Zhou ............... H04L 41/0893 |

(Continued)

FOREIGN PATENT DOCUMENTS

WO  2016086437  6/2016

OTHER PUBLICATIONS

Mell et al., "The NIST Definition of Cloud Computing", NIST, Special Publication 800-145, Sep. 2011, 7 pages.

(Continued)

*Primary Examiner* — Wesner Sajous
(74) *Attorney, Agent, or Firm* — Jay Wahlquist; Andrew D. Wright; Roberts Calderon Safran & Cole, P.C.

(57) ABSTRACT

Approaches for optimized computer display rendering for user vision conditions are provided. A computer-implemented method includes: detecting, by a computer device, a user at the computer device; sending, by the computer device, data associated with the user to a server; receiving, by the computer device, settings from the server; and automatically rendering, by the computer device, a display of the computer device using the settings.

14 Claims, 7 Drawing Sheets

(51) Int. Cl.
*G02B 27/01* (2006.01)
*G06F 3/0487* (2013.01)

(56) References Cited

U.S. PATENT DOCUMENTS

| | | | |
|---|---|---|---|
| 9,704,216 B1 | 7/2017 | Laskar et al. | |
| 10,536,678 B2* | 1/2020 | Anders | G06F 8/38 |
| 2006/0203102 A1 | 9/2006 | Yang et al. | |
| 2007/0055938 A1 | 3/2007 | Herring et al. | |
| 2010/0228836 A1* | 9/2010 | Lehtovirta | H04L 41/0846 709/220 |
| 2014/0204129 A1* | 7/2014 | Oshima | G09G 3/36 345/690 |
| 2014/0282711 A1* | 9/2014 | Xiong | H04N 21/4884 725/34 |
| 2015/0026587 A1* | 1/2015 | Ollivierre | A61B 3/028 715/744 |
| 2015/0192776 A1 | 7/2015 | Lee et al. | |
| 2016/0093102 A1* | 3/2016 | Doyle | G06T 17/20 345/423 |
| 2016/0270656 A1 | 9/2016 | Samec et al. | |
| 2016/0274656 A1* | 9/2016 | Hosabettu | G06F 3/005 |
| 2017/0000324 A1 | 1/2017 | Samec et al. | |
| 2017/0000325 A1 | 1/2017 | Samec et al. | |
| 2017/0000326 A1 | 1/2017 | Samec et al. | |
| 2017/0000329 A1 | 1/2017 | Samec et al. | |
| 2017/0000330 A1 | 1/2017 | Samec et al. | |
| 2017/0000331 A1 | 1/2017 | Samec et al. | |
| 2017/0000332 A1 | 1/2017 | Samec et al. | |
| 2017/0000333 A1 | 1/2017 | Samec et al. | |
| 2017/0000334 A1 | 1/2017 | Samec et al. | |
| 2017/0000335 A1 | 1/2017 | Samec et al. | |
| 2017/0000337 A1 | 1/2017 | Samec et al. | |
| 2017/0000340 A1 | 1/2017 | Samec et al. | |
| 2017/0000341 A1 | 1/2017 | Samec et al. | |
| 2017/0000342 A1 | 1/2017 | Samec et al. | |
| 2017/0000343 A1 | 1/2017 | Samec et al. | |
| 2017/0000345 A1 | 1/2017 | Samec et al. | |
| 2017/0000454 A1 | 1/2017 | Samec et al. | |
| 2017/0000683 A1 | 1/2017 | Samec et al. | |
| 2017/0001032 A1 | 1/2017 | Samec et al. | |
| 2017/0007111 A1 | 1/2017 | Samec et al. | |
| 2017/0007115 A1 | 1/2017 | Samec et al. | |
| 2017/0007116 A1 | 1/2017 | Samec et al. | |
| 2017/0007122 A1 | 1/2017 | Samec et al. | |
| 2017/0007123 A1 | 1/2017 | Samec et al. | |
| 2017/0007182 A1 | 1/2017 | Samec et al. | |
| 2017/0007450 A1 | 1/2017 | Samec et al. | |
| 2017/0007799 A1 | 1/2017 | Samec et al. | |
| 2017/0007843 A1 | 1/2017 | Samec et al. | |
| 2017/0010469 A1 | 1/2017 | Samec et al. | |
| 2017/0010470 A1 | 1/2017 | Samec et al. | |
| 2017/0017083 A1 | 1/2017 | Samec et al. | |
| 2017/0182416 A1* | 6/2017 | Lee | A63F 13/95 |
| 2017/0223233 A1* | 8/2017 | Jung | G09G 3/006 |
| 2018/0210612 A1* | 7/2018 | Lyubich | G06F 3/0488 |
| 2019/0166343 A1 | 5/2019 | Anders et al. | |

OTHER PUBLICATIONS

Vision Aids for People with Impaired Color Perception, The National Institute for Rehabilitation Engineering, 2002, 9 pages.
Types of Colour Blindness, http://www_colourblindawareness.org/colourblindness/types-of-colour-blindness/, Colour Blind Awareness, accessed Nov. 20, 2017, 4 pages.
Enchroma, http:/lenchroma.com/technology/, accessed Nov. 27, 2017, 7 pages.
List of IBM Patents or Patent Applications Treated as Related, dated Nov. 7, 2019, 1 page.

* cited by examiner

OPTIMIZED COMPUTER DISPLAY RENDERING FOR USER VISION CONDITIONS

BACKGROUND

The present invention relates generally to computer display rendering and, more particularly, to optimized computer display rendering for user vision conditions.

Color blindness, also known as color vision deficiency, is the decreased ability to see color or differences in color. The most common cause of color blindness is a fault in the development of one or more of the three sets of color sensing cones in the eye. Red-green color blindness is the most common form, followed by blue-yellow color blindness and total color blindness. Red-green color blindness can affect up to 8% of the population. Macular degeneration is another medical condition that can result in blurred or no vision in the center of the visual field of the eye. When working with computer-based charts and graphs in a business setting, visual conditions such as color-blindness and macular degeneration can cause those individuals delays in processing the information.

SUMMARY

In a first aspect of the invention, there is a computer-implemented method comprising: detecting, by a computer device, a user at the computer device; sending, by the computer device, data associated with the user to a server; receiving, by the computer device, settings from the server; and automatically rendering, by the computer device, a display of the computer device using the settings.

In another aspect of the invention, there is a computer program product comprising a computer readable storage medium having program instructions embodied therewith. the program instructions executable by a server to cause the server to: receive, from a computer device, data associated with a user detected at the computer device; determine settings for the user in response to the receiving the data, wherein the settings are based on a vision condition of the user; and transmit the settings to the computer device for rendering a display of the computer device using the settings.

In another aspect of the invention, there a computer device comprising: a display, a processor, a computer readable memory, and a computer readable storage medium; a detection module configured to automatically detect a user at the computer device; a settings module configured to automatically determine settings based on a vision condition of the user and in response to the detecting the user at the computer device; and a rendering module configured to automatically render the display using the settings and in response to the detecting the user at the computer device. The detection module, the settings module, and the rendering module comprise program instructions stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
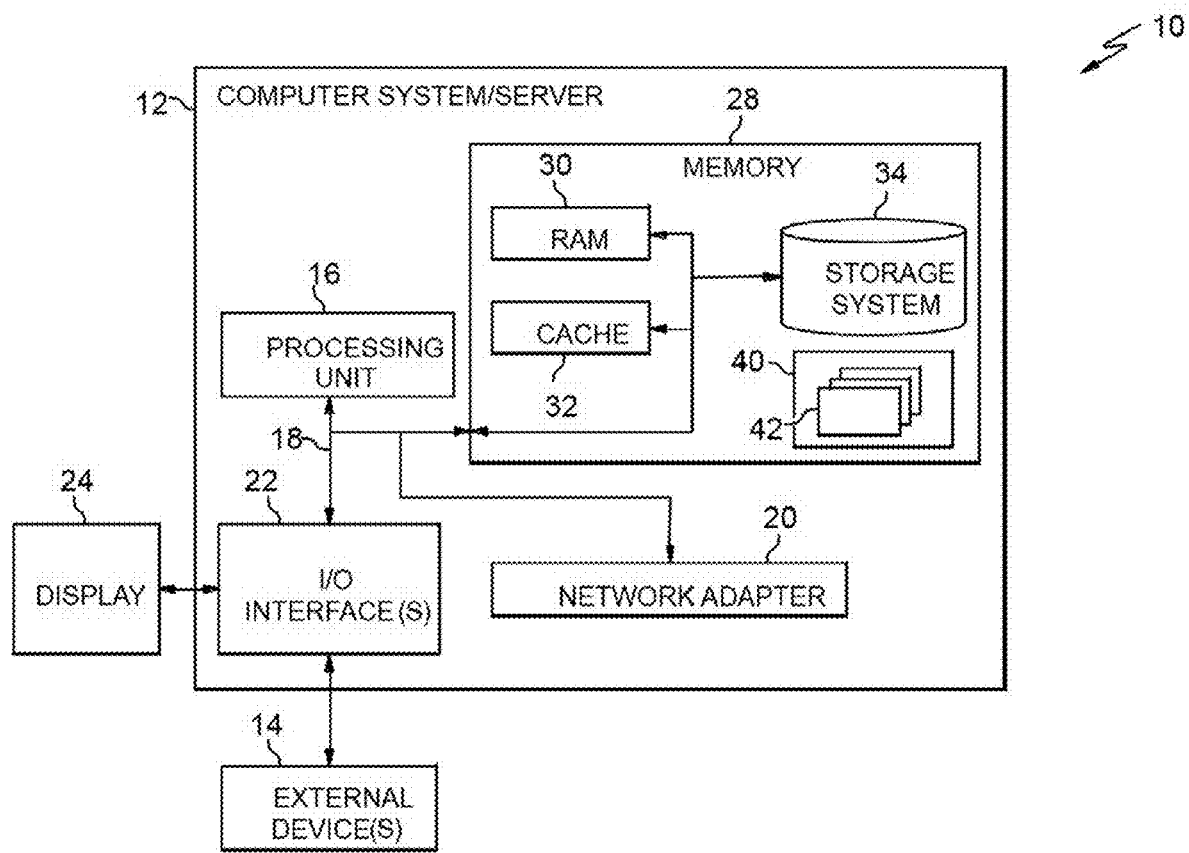
FIG. 1 depicts a cloud computing node according to an embodiment of the present invention.

The present invention relates generally to computer display rendering and, more particularly, to optimized computer display rendering for user vision conditions. Aspects of the invention are directed to learning optimized display settings for a user based on a vision condition of the user, and automatically rendering a computer display using the optimized display settings in response to detecting the user at the computer display. In this manner, implementations of the invention may be used to improve a user's interaction with a computer device by automatically rendering the display of the computer device according to the optimized display settings for the user.

According to aspects of the invention, a system detects a user that is interacting with a computer device. The detection can be, for example, via Internet of Things (IoT) sensor, biometric sensor, or physical recognition techniques such as facial recognition, retina recognition, etc. Based upon detecting the user, the system obtains information about a vision condition of the user including, for example and without limitation, color blindness, macular degeneration, etc. The system is configured to re-render the display of the computer device based on the information about the vision condition of the user. In embodiments, the system is configured to learn optimized display settings for the user by analyzing feedback from the user and re-rendering the display based on the feedback. The learning may be performed in a structured manner, e.g., via predefined questions that prompt the user feedback. Additionally or alternatively, the learning may be performed in an unstructured manner, e.g., via cognitive analysis of unprompted user actions associated with the display. Respective optimized display settings for plural different users may be stored at a central location, such as a cloud service, and can be accessed and applied on demand whenever any of the plural users is detected at an equipped computer device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
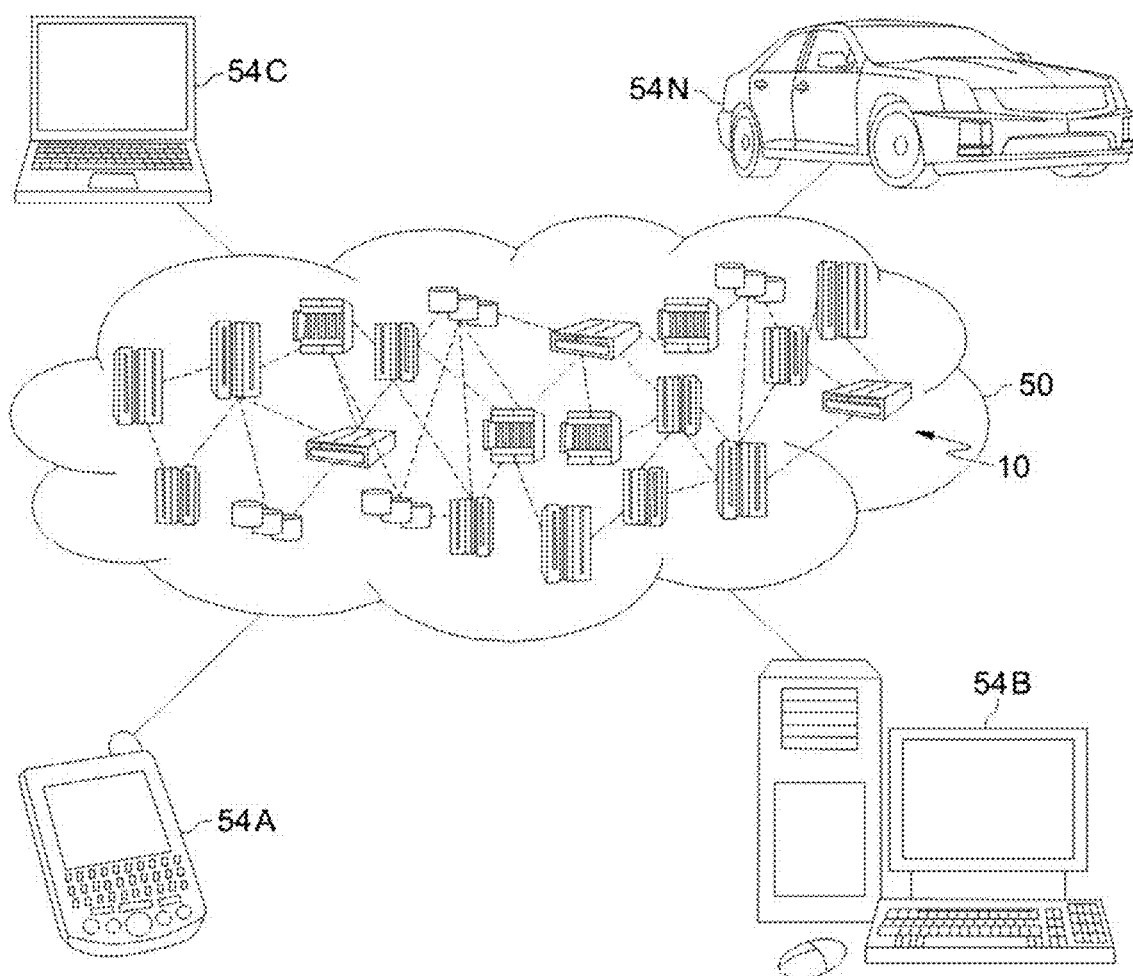
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
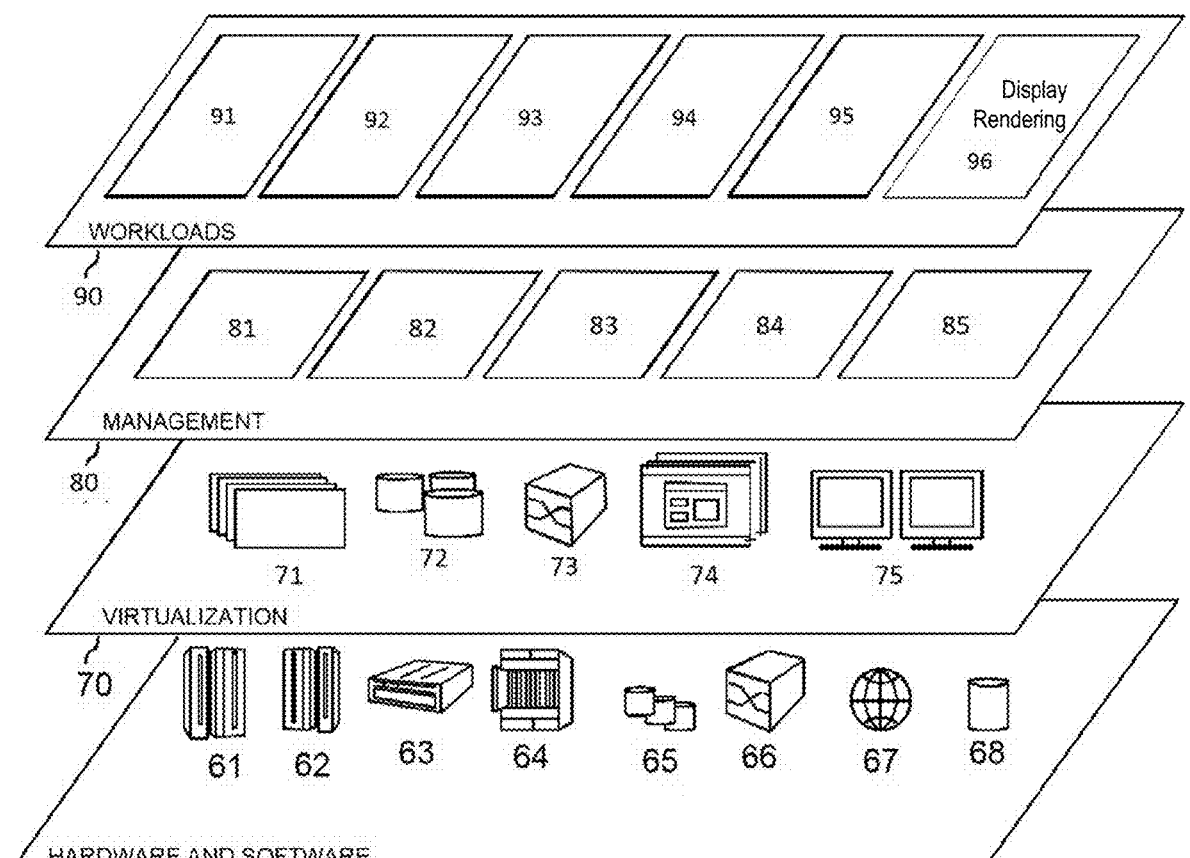
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and display rendering 96.

In accordance with aspects of the invention, the display rendering 96 includes: detecting a user that is interacting with a computer device; obtaining information about a vision condition of the detected user; and rendering the display of the computer device based on the information about the vision condition of the user. In additional aspects, the display rendering 96 includes: learning optimized display settings for the user by analyzing feedback from the user and re-rendering the display based on the feedback; storing optimized display settings for plural different users at a central location; and accessing and applying a stored optimized display setting at a computer device when one of the plural different users is detected at the computer device.

Figure 4:
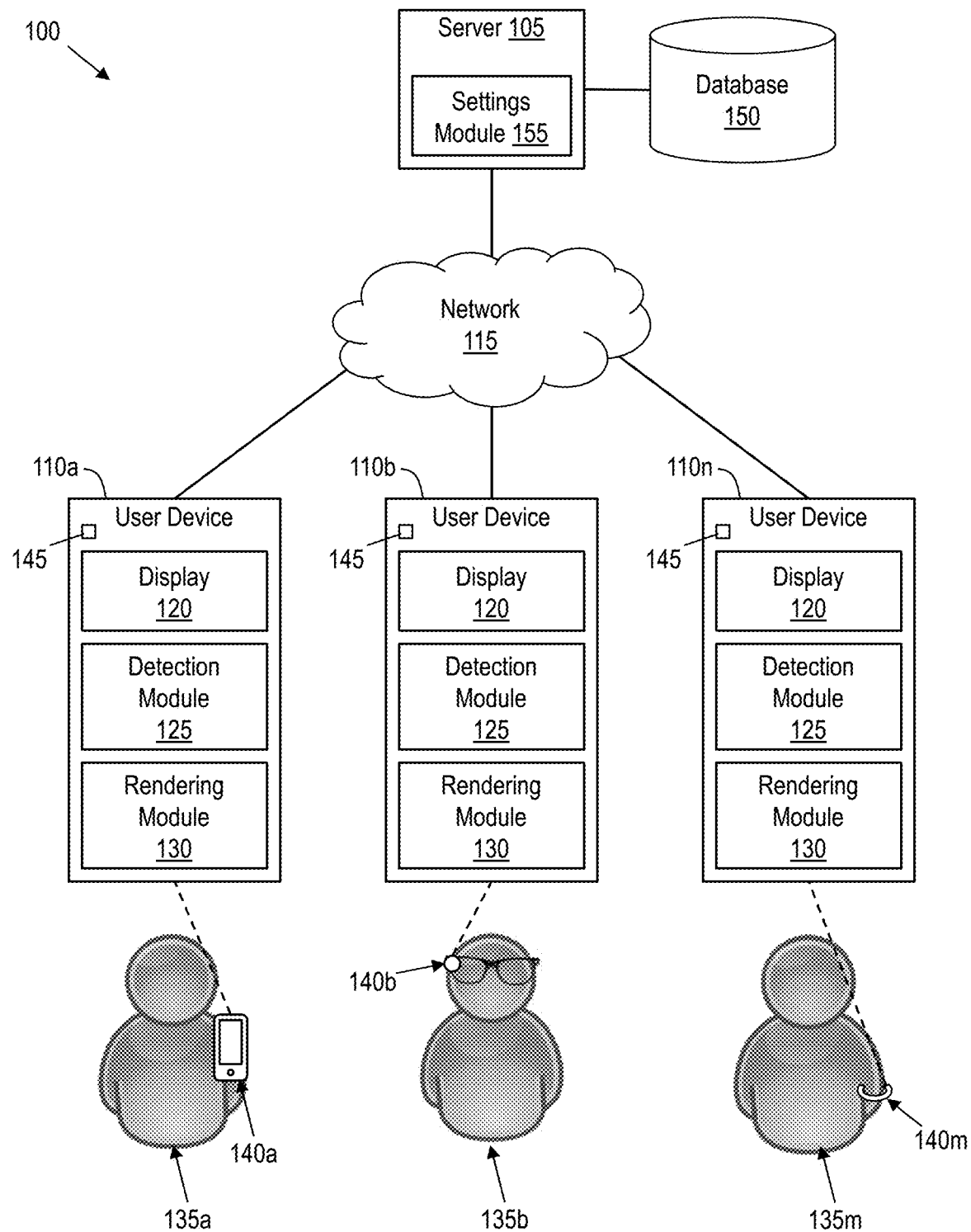
FIG. 4 shows a block diagram of an exemplary environment in accordance with aspects of the invention.
Figure 5:
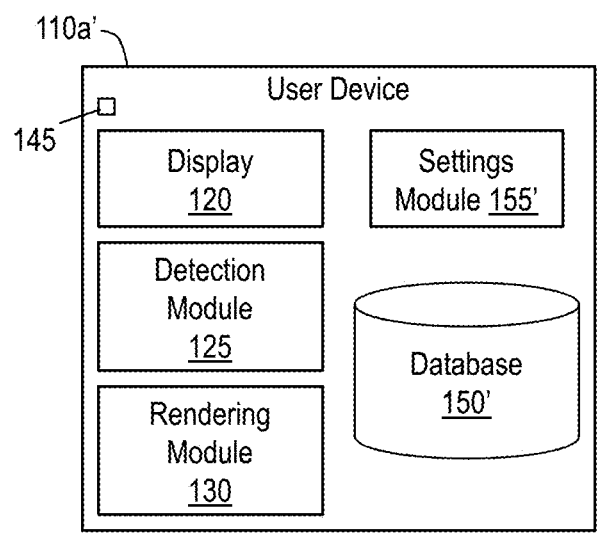
FIG. 5 shows a block diagram of another exemplary environment in accordance with aspects of the invention.
Figure 5:
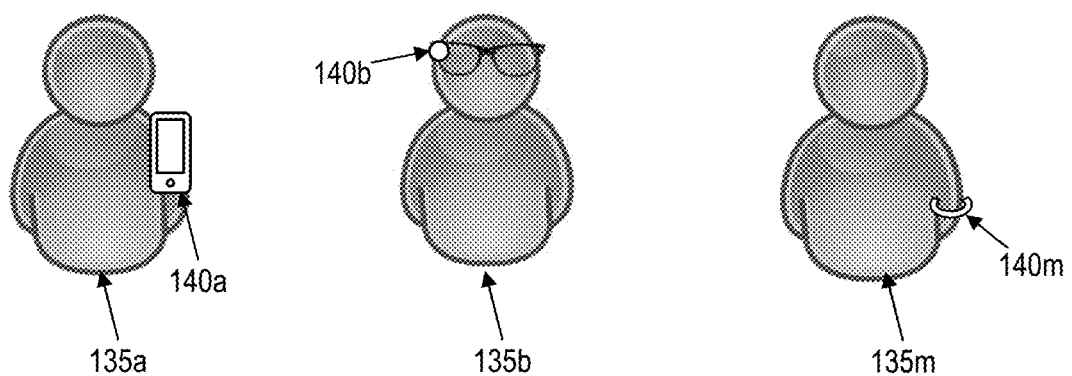

FIG. 4 shows a block diagram of an exemplary server-based environment 100 in accordance with aspects of the invention. FIG. 5 shows a block diagram of an alternative embodiment comprising a single computing device.

Referring now to FIG. 4, the server-based environment 100 includes a server 105 connected to plural computer devices 110a-n by a network 115, where "n" represents any suitable number of computer devices. The server 105 may comprise one or more instantiations of a computer system/server 12 as described with respect to FIG. 1. In embodiments, the server 105 comprises a settings module 155, which may be one or more program modules 42 described with respect to FIG. 1, and which is configured to determine display settings for a user as described herein.

The network 115 may comprise any suitable communication network including but not limited to a local area network (LAN), wide area network (WAN), and the Internet. In an embodiment, the network 115 comprises, or is part of, a cloud computing environment such as cloud computing environment 50 of FIG. 2. In this embodiment, each of the server 105 and the computer devices 110a-n comprises a respective cloud computing node such as cloud computing nodes 10 of FIG. 2. The invention is not limited to a cloud-based implementation, however, and other architectures may be employed.

According to aspects of the invention, each computer device 110a-n comprises a user computer device such as a desktop computer, laptop computer, tablet computer, smartphone, etc., and may comprise one or more components of the computer system/server 12 of FIG. 1. In embodiments, each computer device 110a-n includes a display 120 comprising a visual output device having at least one configurable setting such as, but not limited to, resolution, color, contrast, brightness, gamma, etc. The respective display 120 for each computer device 110a-n may comprise, for example, a liquid crystal display (LCD), an organic light-emitting diode (OLED) display, or a later-developed display technology.

In embodiments, each computer device 110a-n includes a user detection module 125 and a rendering module 130. Each of the modules 125, 130 may comprise one or more program modules 42 as described with respect to FIG. 1, and are configured to perform one or more of the functions described herein. Aspects of the invention are not limited to the exact number of modules shown in FIG. 4, and fewer modules may be used by combining the functionality of one or more modules into another module. Conversely, more modules may be employed by splitting the functionality of one or more of the modules shown into plural different modules.

According to aspects of the invention, the user detection module 125 of a respective one of the computer devices 110a-n is configured to detect a user (e.g., one of users 135a-m) that is interacting with the respective one of the computer devices 110a-n. In embodiments, the user detection module 125 detects the user by employing at least one of sensor-based detection and physical recognition. In a sensor-based detection embodiment, the user detection module 125 is configured to detect the user by detecting a device 140a-m that is physically carried by (on the person of) the user. Examples of such devices 140a-m include, but are not limited to, IoT devices, smartphones, and wearable biometric devices. For example, the device may include an IoT device 140b embedded in the user's eyeglasses. In another example, the device may comprise the user's smartphone 140a, smartwatch 140m, fitness band, etc. The user detection module 125 may be configured to detect the device 140a-m utilizing hardware of the computer device 110a-n and one or more conventional protocols such as RFID, Bluetooth, WLAN, NFC, etc.

In accordance with aspects of the invention, the user detection module 125 is configured to receive data from the device 140a-m based on detecting the device 140a-m. In embodiments, the device 140a-m is programmed with a user identifier associated with the user. The user identifier may comprise, for example, a unique name, number or other data structure that is unique to user. In additional embodiments, the device 140a-m is programmed with data defining a vision condition of the user (e.g., protanopia, deuteranopia, tritanopia, macular degeneration, etc.). The data defining the user identifier and the data defining a vision condition of the user may be anonymized (e.g., hashed, encrypted, etc.) to protect the privacy of the user. The user detection module 125 may be configured to receive, from the device 140a-m, the user identifier and the data defining a vision condition of the user utilizing hardware of the computer device 110a-n and one or more conventional protocols such as RFID, Bluetooth, WLAN, NFC, etc. In embodiments, the user detection module 125 transmits the data defining the user identifier and the data defining a vision condition of the user to the server 105.

With continued reference to FIG. 4, in accordance with aspects of the invention, the rendering module 130 is configured to render the display 120 of the respective computer device 110a-n based on data associated with the detected user. As used herein, rendering the display 120 refers to selectively adjusting one or more settings of the display 120, including but not limited to resolution, color, contrast, brightness, gamma settings of the display 120. In some situations, the rendering module 130 obtains previously determined settings for the detected user based on the identity of the detected user, and renders the display 120 using the previously determined settings. In other situations, the rendering module 130 obtains settings for the detected user based on the data defining a vision condition of the user, and renders the display 120 using the determined settings.

For example, the server 105 may store data in a database 150 defining a respective user identifier for each user that has been detected by any one of the computer devices 110a-n in the past (referred to herein as previous users). When the user detection module 125 of a particular computer device 110a-n detects a current user, the user detection module 125 communicates with the server 105 to determine whether the current user is a previous user, e.g., by sending the user identifier of the current user to the server for comparing to the list of user identifiers of previous users.

In the event that the server 105 determines the current user is a previous user (i.e., there is a match), the server 105 obtains data defining previously determined settings for this user (e.g., from the database 150), and transmits the data defining the previously determined settings to the rendering module 130 of the particular computer device 110a-n that has detected the user. Upon receipt of the previously determined settings for this user, the rendering module 130 renders the display 120 of the particular computer device 110a-n using the previously determined settings. This may comprise, for example, adjusting any one or more of the resolution, color, contrast, brightness, gamma settings of the display 120.

In the event that the server 105 determines that the current user is not a previous user (e.g., there is not a match), then the server 105 determines settings for the current user based on the data defining a vision condition of the current user. In embodiments, the server 105 comprises the settings module 155 that determines display settings for the current user. The determination may be based on comparing the user's vision condition to predefined a list of settings configurations associated with the vision condition.

For example, the database 150 may store predefined lists of different settings configurations associated with different vision conditions. For example, the database 150 may store a ranked list of plural different settings configurations associated with protanopia. Each respective one of the settings configurations for protanopia may define a different combination of at least one of a resolution, color, contrast, brightness, and gamma settings. The list may be ranked in order of estimated (or objectively determined) helpfulness for users with protanopia. Similarly, the database 150 may store a different ranked list of plural different settings configurations associated with deuteranopia, a different ranked list of plural different settings configurations associated with tritanopia, and a different ranked list of plural different settings configurations associated with macular degeneration. The database 150 may similarly store one or more additional ranked lists for other vision conditions not mentioned herein.

In this manner, upon determining that the current user is not a previous user (e.g., there is not a match of user identifiers), the server 105 may access the list of settings configurations associated with the particular vision condition of the user, determine settings for this user by selecting one of the settings configurations from the list, and transmit data defining the determined settings to the rendering module 130 of the user computer device 110a-n. Upon receipt of the determined settings for this user, the rendering module 130 renders the display 120 of the particular computer device 110a-n using the determined settings. This may comprise, for example, adjusting any one or more of the resolution, color, contrast, brightness, gamma settings of the display 120.

According to aspects of the invention, the server 105 stores user data associated with plural different users 135a-m. In this manner, any single user (e.g., user 135b) may sit at any single one of the computer devices (e.g., 135a), and the system will determine and apply display settings for this particular user in the manner described herein.

Still referring to FIG. 4, the rendering module 130 of each computer device 110a-n may be further configured to obtain feedback from the user, and to re-render the display 120 based on the feedback. In this manner, the rendering module can learn optimized settings for a particular user based on the feedback obtained from the user. The feedback may be obtained in a structured manner, e.g., via predefined questions that prompt the user feedback. Additionally or alternatively, the feedback may be obtained in an unstructured manner, e.g., via cognitive analysis of unprompted user actions associated with the display.

To obtain feedback in a structured manner, the rendering module 130 may be configured to alert the user that the display 120 has been dynamically rendered for this user. For example, based on rendering the display 120 using the settings received from the settings module 155, the rendering module 130 may cause the display 120 to display a message: "This display has been dynamically rendered for you." This message is merely an example, and any type of visual and/or audible message may be used to alert the user that the display has been dynamically rendered.

In addition to alerting the user, the rendering module 130 may be configured to prompt the user for feedback regarding the rendering of the display. For example, the rendering module 130 may cause the display 120 to display a message asking the user to provide a first type of input if the user is satisfied with the current rendering of the display, or to provide a second type of input if the user is dissatisfied with the current rendering of the display. Any types of user inputs may be utilized as the first type and second type of input, including but not limited to: mouse click, keyboard input, touchscreen gesture (e.g., tap, double tap, swipe, etc.), verbal input (detected by a microphone of the computer device), and physical gesture (detected by a camera of the computer device).

In response to receiving the first type of input (i.e., the user is satisfied with the current rendering of the display), the rendering module 130 transmits a message to the settings module 155, and the settings module 155 saves the current settings as the optimized settings for this particular user. In this situation, the rendering module 130 maintains the rendering of the display 120 with the settings with which the user indicated satisfaction.

In response to receiving the second type of input (i.e., the user is dissatisfied with the current rendering of the display), the rendering module 130 transmits a message to the settings module 155, and the settings module 155 determines new settings for this user based on the user's vision condition and the feedback. In one example, the settings module 155 accesses the ranked list of plural different settings configurations associated with user's vision condition, and selects the next highest settings configuration from the list. In another example, the settings module 155 may be programmed with an algorithm for determining new settings based on an analysis of previously tried settings configurations for this user. In either situation, the settings module 155 returns the new settings to the rendering module 130, which then renders the display 120 of the particular computer device 110a-n using the new settings. The system can go through plural iterations in this manner (e.g., the system rendering the display with certain settings, the user providing negative feedback, and the system re-rendering the display with new settings based on the feedback), until such time as the user provides positive feedback for a particular rendering of the display 120 (e.g., until the user provides the first type of input indicating they are satisfied with the current rendering of the display). In this manner, the system can learn optimized settings for a particular user based on structured feedback from the user. The system may perform this optimization separately for each of the plural users 135a-m, such that each user has optimized settings that are personalized to them.

In the unstructured technique for obtaining user feedback, the system may be configured to: detect unprompted user actions associated with the display 120, determine new settings based on analyzing the unprompted user actions, and re-render the display 120 using the determined new settings. For example, after rendering the display 120 using determined settings, the rendering module 130 may be configured to detect that the user is performing one or more of the following actions: squinting (e.g., detected by a camera of the computer device), and manually adjusting one of the display settings (e.g., by physical button or dial, or by user interface). In response to detecting this type of user input, the rendering module 130 transmits a message to the settings module 155, and the settings module 155 determines new settings for this user based on the user's vision condition and the input. In one example, the settings module 155 accesses the ranked list of plural different settings configurations associated with user's vision condition, and selects the next highest settings configuration from the list. In another example, the settings module 155 may be programmed with an algorithm for determining new settings based on an analysis of previously tried settings configurations for this user. In either situation, the settings module 155 returns the new settings to the rendering module 130, which then renders the display 120 of the particular computer device 110*a-n* using the new settings.

FIG. 4 has thus far been described with respect to detecting a user (e.g., one of users 135*a-m*) based on detecting a device (e.g., one of devices 140*a-m*). Additionally or alternatively to detecting a user via a device 140*a-m*, the user detection module 125 may be configured to detect a user (e.g., a person using the computer device 110*a-n*) by employing at least one computer-based physical recognition technique such as facial recognition (e.g., via image processing), finger print detection (e.g., via image processing, capacitive systems, etc.), retina and/or iris scanning (e.g., via image processing), and voice recognition (e.g., via audio processing). Each computer device 110*a-n* may be equipped with appropriate hardware 145 for obtaining data for performing such physical recognition techniques, including but not limited to a camera, a microphone, and a capacitive fingerprint sensor. In embodiments, the user detection module 125 transmits the data from the physical recognition technique to the server 105, which is configured to determining an identity of the user based on the data from the physical recognition technique. After the server 105 determines the identity of the user in this manner, the process of determining settings and rendering the display 120 based on the determined settings may proceed in the manner already described herein.

Aspects of the invention have been described thus far with respect to the server-based implementation shown in FIG. 4, in which plural different computer devices 110*a-n* communicate with a server 105 that determines the settings for the user. In another embodiment, the user computer device may determine the settings for the user. For example, as shown in FIG. 5, a user computer device 110*a'* may include the display 120, detection module 125, and rendering module 130 as previously described. As further depicted in FIG. 5, the user computer device 110*a'* may include a settings module 155' and database 150' that perform functions similar to the settings module 155 and database 150 described with respect to FIG. 4. For example, the database 150' may store user identifiers, predefined lists of different settings configurations associated with different vision conditions, and previously determined settings for previous users. The settings module 155' may be configured to determine settings for a user based on the user identifier and the user's vision condition (and optionally based on user feedback) in a manner similar to that described with respect to the settings module 155. In this manner, the user computer device 110*a'* is a stand-alone device that can detect a user, determine display settings based on a vision condition of the user, and render the display 120 using the determined settings. The database 150' may store data for plural different users, such that the user computer device 110*a'* may render the display differently for different users based on the respective vision conditions of the different users.

In an additional optional aspect of the invention, the rendering module 130 may be configured to determine whether the operating system of the computer device 110*a-n* is running other software that is configured to address vision conditions. In some implementations, the rendering module 130 may be configured to override the other software when rendering the display 120 using the determined settings (received from the settings module 155 or 155'). In other embodiments, the rendering module 130 may be configured to communicate with the other software to render the display 120 using a combination of the determined settings (received from the settings module 155 or 155') and one or more settings defined by the other software.

Figure 6:
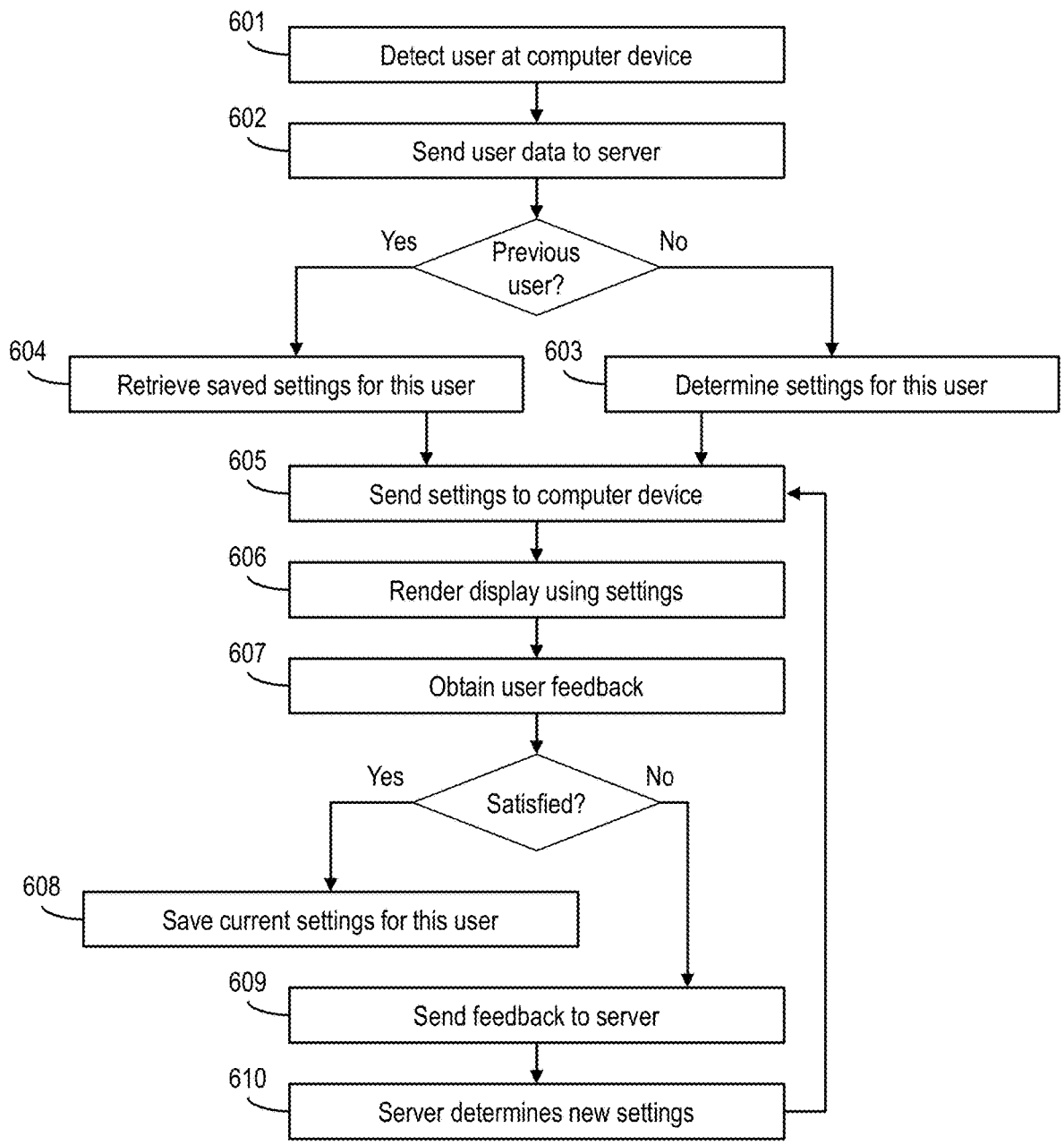
FIG. 6 shows a flowchart of a method in accordance with aspects of the invention.

FIG. 6 shows an example flowchart of a method in accordance with aspects of the invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

At step 601, a system detects a user at a computer device. In embodiments, as described with respect to FIG. 4, a detection module (e.g., detection module 125) of a computer device (e.g., one of 110*a-n*) detects a user (e.g., one of 135*a-m*) by detecting a device (e.g., one of 140*a-m*) or via a computer-based physical recognition technique. Step 601 may include the computer device obtaining data from the detected device, the data including a user identifier and data defining a vision condition of the user.

At step 602, the computer device transmits the data obtained at step 601 to a server (e.g., server 105). In response to receiving the data, the server determines whether the detected user is a previous user. For example, as described with respect to FIG. 4, the server may compare the user identifier received from the computer device to a list of user identifiers stored, e.g., in a database.

In the event that the detected user is not a previous user, then at step 603 the server determines settings for the user. In embodiments, as described with respect to FIG. 4, a settings module (e.g., settings module 155) of the server determines settings for the user based on the data that defines the vision condition of the user.

In the event that the detected user is a previous user, then at step 604 the server retrieves saved settings associated with this user. For example, as described with respect to FIG. 4, the server may store settings associated with previous users in the database.

At step 605, following either step 603 or step 604, the server sends the determined settings to the computer device. At step 606, the computer device renders the display using the settings received from the server. In embodiments, as described with respect to FIG. 4, a rendering module (e.g., rendering module 130) of the computer device dynamically adjusts at least one parameter of the display (e.g., display 120) of the computer device based on the settings received from the server.

At step 607, the computer device obtains feedback from the user. In embodiments, as described with respect to FIG. 4, the rendering module may obtain structured and/or unstructured feedback from the user in response to the rendering of step 606. In embodiments, the rendering module determines, based on the feedback, whether the user is satisfied with the rendering of step 606.

In response to determining that the user is satisfied with the rendering of step 606, then at step 608 the rendering module maintains the rendering of step 606 and sends a message to the server to save the settings (sent at step 605 and applied at step 606) as the optimized settings for this user.

In response to determining that the user is dissatisfied with the rendering of step 606, then at step 609 the rendering module sends the feedback to the server. At step 610, the server determines new settings for this user based on the vision condition of the user and the feedback. After determining the new settings at step 610, the process loops back to step 605 where the server sends the newly determined settings to the computer device.

Figure 7:
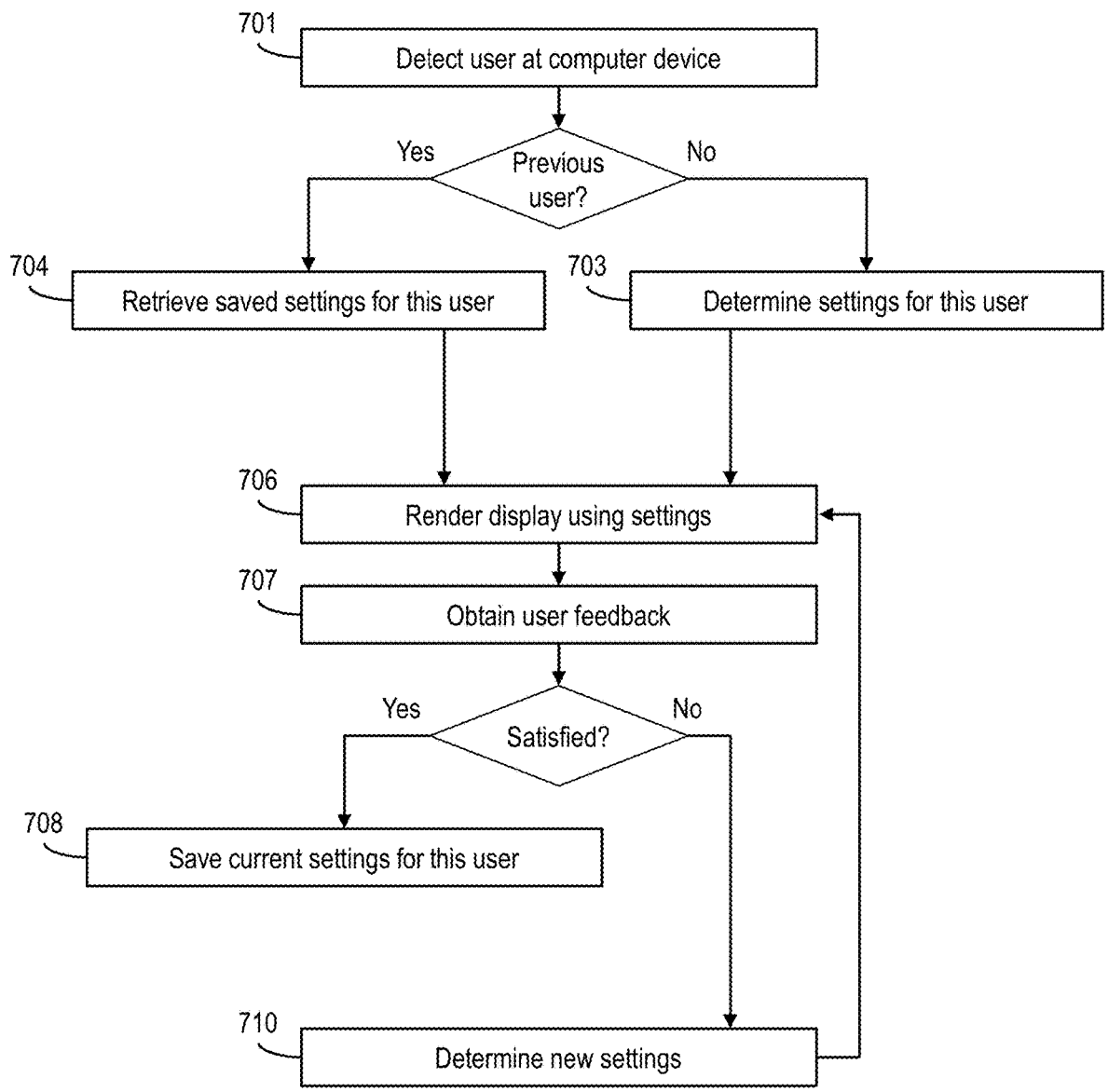
FIG. 7 shows a flowchart of another method in accordance with aspects of the invention.

FIG. 7 shows an example flowchart of a method in accordance with aspects of the invention. The steps of FIG. 7 may be implemented in the environment of FIG. 5, for example, and are described using reference numbers of elements depicted in FIG. 5.

At step 701, a system detects a user at a computer device. In embodiments, as described with respect to FIG. 5, a detection module (e.g., detection module 125) of a computer device (e.g., computer device 110a') detects a user (e.g., one of 135a-m) by detecting a device (e.g., one of 140a-m) or via a computer-based physical recognition technique. Step 701 may include the computer device obtaining data from the detected device, the data including a user identifier and data defining a vision condition of the user. In response to obtaining the data, the computer device 110a' determines whether the detected user is a previous user. For example, as described with respect to FIG. 4, the computer device 110a' may compare the user identifier received from the computer device to a list of user identifiers stored, e.g., in a database.

In the event that the detected user is not a previous user, then at step 703 the computer device 110a' determines settings for the user. In embodiments, as described with respect to FIG. 5, a settings module (e.g., settings module 155') of the computer device 110a' determines settings for the user based on the data that defines the vision condition of the user.

In the event that the detected user is a previous user, then at step 704 the computer device 110a' retrieves saved settings associated with this user. For example, as described with respect to FIG. 5, the computer device 110a' may store settings associated with previous users in the database.

At step 706, the computer device 110a' renders the display using the settings from step 703 or 704. In embodiments, as described with respect to FIG. 4, a rendering module (e.g., rendering module 130) of the computer device 110a' dynamically adjusts at least one parameter of the display (e.g., display 120) of the computer device 110a' based on the settings.

At step 707, the computer device 110a' obtains feedback from the user. In embodiments, as described with respect to FIG. 4, the rendering module may obtain structured and/or unstructured feedback from the user in response to the rendering of step 706. In embodiments, the rendering module determines, based on the feedback, whether the user is satisfied with the rendering of step 706.

In response to determining that the user is satisfied with the rendering of step 706, then at step 708 the rendering module maintains the rendering of step 706 and saves the settings (applied at step 706) as the optimized settings for this user.

In response to determining that the user is dissatisfied with the rendering of step 706, then at step 710, the computer device 110a' determines new settings for this user based on the vision condition of the user and the feedback. After determining the new settings at step 710, the process loops back to step 706 where the computer device 110a' renders the display using the new settings.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer device comprising:
a display, a processor, a computer readable memory, a computer readable storage medium, and program instructions stored on the computer readable storage medium for execution by the processor that cause the computer device to:
detect a user at the computer device;
send data associated with the user to a server;
receive settings from the server;
render the display based on the received settings;
detect unprompted user actions associated with the display;
communicate with the server to determine new settings based on analyzing the unprompted user actions; and
re-render the display using the new settings.

2. The computer device of claim 1, wherein:
the display is a visual output device; and
the rendering comprises adjusting resolution, color, contrast and brightness settings of the display.

3. The computer device of claim 1, wherein the data associated with the user comprises data defining a vision condition of the user.

4. The computer device of claim 3, wherein the vision condition comprises one selected from the group consisting of: protanopia, deuteranopia, tritanopia, and macular degeneration.

5. The computer device of claim 1, wherein the detecting the user comprises detecting a device carried or worn by the user.

6. The computer device of claim 5, wherein the computer device is configured to obtain the data associated with the user from the device carried or worn by the user.

7. The computer device of claim 6, wherein the device carried or worn by the user comprises one or more selected from the group consisting of: an IoT device, a smartphone, and a wearable biometric device.

8. The computer device of claim 1, wherein the detecting the user comprises a computer-based physical recognition technique.

9. The computer device of claim 8, wherein the computer-based physical recognition technique comprises at least one from the group consisting of: facial recognition, finger print detection, retina and/or iris scanning, and voice recognition.

10. A computer program product comprising a computer readable storage medium having program instructions embodied therewith, the program instructions executable by a computer device to cause the computer device to:
    detect a user at the computer device;
    send data associated with the user to a server;
    receive settings from the server;
    render a display based on the received settings;
    obtain feedback from the user; and
    re-render the display based on the feedback,
    wherein the feedback is obtained via cognitive analysis of unprompted user actions associated with the display.

11. A computer-implemented method comprising:
    detecting a user at a computer device comprising a display;
    determining, by the computer device, settings based on a vision condition of the user and in response to the detecting the user at the computer device;
    rendering the display using the settings and in response to the detecting the user at the computer device;
    detect unprompted user actions associated with the display;
    determine new settings based on the analyzing the unprompted user actions; and
    re-render the display using the new settings.

12. The computer-implemented method of claim 11, wherein:
    the display is a visual output device; and
    the rendering comprises adjusting one or more selected from the group consisting of: resolution, color, contrast and brightness; and
    the vision condition comprises one selected from the group consisting of: protanopia, deuteranopia, tritanopia, and macular degeneration.

13. The computer-implemented method of claim 11, wherein the detecting the user comprises detecting a device carried or worn by the user, the device comprising one or more selected from the group consisting of: an IoT device, a smartphone, and a wearable biometric device.

14. The computer-implemented method of claim 13, further comprising obtain data associated with the user from the device carried or worn by the user, the data including at least one selected from the group consisting of: a user identifier, and data defining the vision condition.

* * * * *